US011907368B1

United States Patent
Ye et al.

(10) Patent No.: US 11,907,368 B1
(45) Date of Patent: Feb. 20, 2024

(54) GRAPH-BASED ANOMALY DETECTION FOR CYBERSECURITY

(71) Applicant: Trend Micro Incorporated, Tokyo (JP)

(72) Inventors: Peng Ye, Nanjing (CN); Jingchen Ke, Nanjing (CN)

(73) Assignee: Trend Micro Incorporated, Tokyo (JP)

(*) Notice: Subject to any disclaimer, the term of this patent is extended or adjusted under 35 U.S.C. 154(b) by 260 days.

(21) Appl. No.: 17/534,727

(22) Filed: Nov. 24, 2021

(51) Int. Cl.
*G06F 21/55* (2013.01)

(52) U.S. Cl.
CPC .......... *G06F 21/552* (2013.01); *G06F 21/554* (2013.01); *G06F 2221/2101* (2013.01)

(58) Field of Classification Search
CPC .................. G06F 21/552; G06F 21/554; G06F 2221/2101
See application file for complete search history.

(56) References Cited

U.S. PATENT DOCUMENTS

| | | | | |
|---|---|---|---|---|
| 2016/0373476 | A1* | 12/2016 | Dell'Anno | G06F 21/552 |
| 2017/0013003 | A1* | 1/2017 | Samuni | G06F 11/00 |
| 2017/0063912 | A1* | 3/2017 | Muddu | G06V 10/225 |
| 2020/0128047 | A1* | 4/2020 | Biswas | H04L 67/10 |

OTHER PUBLICATIONS

Audit logs in Azure Active Directory | Microsoft Docs, 8 sheets [retrieved on Nov. 12, 2021], retrieved from the internet: https://docs.microsoft.com/en-us/azure/active-directory/reports-monitoring/concept-audit-logs.
Sign-in logs in Azure Active Directory, 18 sheets [retrieved on Nov. 12, 2021], retrieved from the internet: https://docs.microsoft.com/en-us/azure/active-directory/reports-monitoring/concept-sign-ins.
Shaosheng Cao, et al. "Deep Neural Networks for Learning Graph Representations", 2016, pp. 1145-1152, Proceedings of the Thirtieth AAAI Conference on Artificial Intelligence (AAAI-16).
Jundong Li, et al. "Radar: Residual Analysis for Anomaly Detection in Attributed Networks", 2016, 7 sheets, Computer Science and Engineering, Arizona State University.
Joakim Skarding, et al. "Foundations and modelling of dynamic networks using Dynamic Graph Neural Networks: A survey", Jun. 2021, pp. 1-28, Complex Adaptive Lab, Data Science Institute, University of Technology, Sydney, Australia.
Leman Akoglu, et al. "Graph-based Anomaly Detection and Description: A Survey", Apr. 2014, pp. 1-68, Department of Computer Science, Stony Brook, New York.

* cited by examiner

*Primary Examiner* — Nelson S. Giddins
(74) *Attorney, Agent, or Firm* — Beyer Law Group LLP

(57) ABSTRACT

Anomalous activities on a computer network are detected from audit or sign-in activity information of a target entity as recorded in an audit or sign-in log. A baseline graph of the target entity is generated using information on activities of the target entity during a collection period. A predict graph of the target entity is generated with information on activities of the target entity during another collection period, which follows and is shorter than the earlier collection period. A residual graph that indicates nodes or edges that are in the predict graph but not in the baseline graph is generated. The residual graph is scored and the score is compared to a threshold to determine whether the target entity has performed an anomalous activity.

20 Claims, 13 Drawing Sheets

GRAPH-BASED ANOMALY DETECTION FOR CYBERSECURITY

TECHNICAL FIELD

The present invention is generally directed to cybersecurity, and more particularly but not exclusively to detecting anomalous activities in a computer network.

BACKGROUND

Enterprise computer networks maintain one or more activity logs that keep track of activities on the network. For example, the Microsoft Azure™ cloud computing platform maintains a sign-in log containing information about sign-ins and how computing resources (e.g., applications) are employed by users; an audit log containing information about changes applied to tenants, such as users and group management, or updates applied to the tenant's resources; and a provisioning log containing information on activities performed by the platform's provisioning service.

Enterprise networks that are cloud-based are especially vulnerable to cyber attacks because users can access them from various physical locations, including over the Internet. These cyber attacks include unauthorized sign-in and audit activities. To protect against cyber attacks, the activity logs record failed attempts to perform an activity on the network. As an example, the sign-in log may indicate the following information for a failed sign-in activity: timestamp (i.e., date and time), account, status, failure reason, Internet Protocol (IP) address, location etc. As another example, an audit log may indicate the following information for a failed audit activity: time stamp, account, type, category, activity, etc. Existing approaches for analyzing activity logs to detect anomalous activities typically employ statistics, heuristic rules, and machine learning models. These approaches can get overly complex and have high false positives.

To detect anomalous activities, activity logs may also be processed as graph data structures, using Deep Graph Neural Networks (DGNN) for example. However, DGNN and other existing graph-based approaches do not fully address the computational challenges of processing activity logs of enterprise networks. For example, existing graph-based approaches often suffer from network sparsity and data nonlinearity issues and fail to capture the complex interactions between different information modalities.

BRIEF SUMMARY

Anomalous activities on a computer network are detected from audit or sign-in activity information of a target entity as recorded in an audit or sign-in log. A baseline graph of activities of a target entity is generated with information on activities of the target entity during a first information collection period as recorded in an activity log of a cloud computing platform. A predict graph of activities of the target entity is generated with information on activities of the target entity during a second information collection period as recorded in the activity log of the cloud computing platform, wherein the second information collection period follows and is shorter than the first information collection period. A residual graph that indicates nodes or edges that are in the predict graph but not in the baseline graph is generated. The baseline, predict, and residual graphs each comprises a central node and neighbor nodes that are connected to the central node by corresponding edges, wherein the central node represents the target entity, and each edge represents an attribute of an activity performed by the target entity on another entity represented by a neighbor node that is connected to the central node by the edge. A score of the residual graph is generated based at least on weights assigned to the edges. The target entity is deemed as having performed one or more anomalous activities in response to the score of the residual graph being greater than a threshold.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
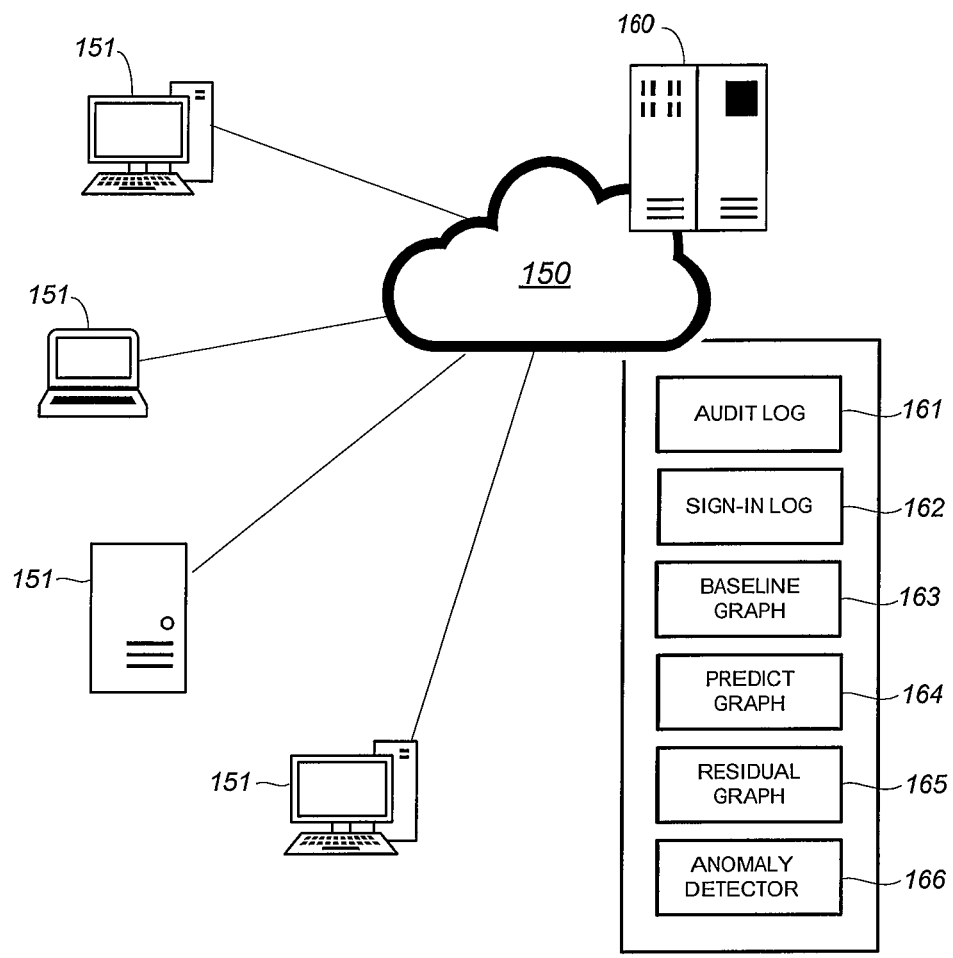
FIG. 1 shows a logical diagram of an enterprise computer network in accordance with an embodiment of the present invention.

FIG. 1 shows a logical diagram of an enterprise computer network 150 in accordance with an embodiment of the present invention. The network 150 is an "enterprise network" in that it is a computer network of an organization, such as a company, government, or educational institution, and accordingly has many users that access the computer network from various locations including over the Internet.

The network 150 includes a computer system 160, which in the example of FIG. 1 comprises one or more server computers of a cloud computing platform. In one embodiment, the network 150 is implemented on the Microsoft Azure™ cloud computing platform. Users of the network 150 employ corresponding user computers 151 to connect to the network 150 to access various services, applications, etc. that are provided on or by way of the network 150. A user may be represented by an Internet Protocol (IP) address of the user's computer, account assigned to the user (e.g., Microsoft Azure™ account name or identifier), or other identifier that is associated with the user. As can appreciated, a public cloud computing platform, such as the Microsoft Azure™ cloud computing platform, provides cloud computing services to many, different organizations. In the example of FIG. 1, the organization that maintains and operates the network 150 is a "tenant" of the cloud computing platform.

The network 150 records activities on one or more audit logs 161 and one or more sign-in logs 162, which in one embodiment are activity logs provided by the Microsoft Azure™ cloud computing platform. An activity may be performed by an entity, which may be a user account, computer, service, software application, etc. An audit log 161 contains, among other information, audit activity information, such as information on activities involving user management (e.g., create an account, update an account, disable an account or account privileges) and application management (e.g., authorize to access a software application). A sign-in log 162 contains, among other information, sign-in activity information, such as information on activities involving remote logon, local logon, and certain types of network connections (e.g., Remoted Desktop Protocol (RDP) connection, Server Message Block (SMB) connection).

The network 150 includes an anomaly detector 166 that comprises instructions stored in a memory of the computer system 160 that, when executed by at least one processor of the computer system 160, cause the computer system 160 to generate a baseline graph 163, a predict graph 164, and a residual graph 165 and to calculate a score of the residual graph 165 to detect entities that perform anomalous activities. An "anomalous activity" is a sign-in or audit activity of an entity that is an anomaly relative to past activities of the entity. Anomalous activities are indicative of cyber attacks and thus need to be detected as early as possible to protect the network. An alert may be raised in response to detection of an anomalous activity so that the anomalous activity may be investigated and/or mitigated.

Figure 2:
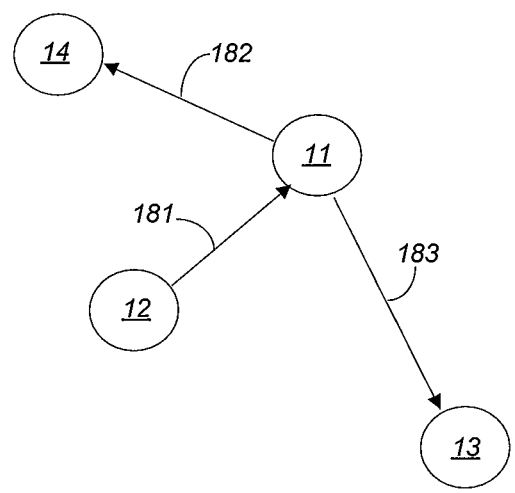
FIG. 2 shows an example graph that may represent information recorded in an audit log or a sign-in log.

Generally speaking, information recorded in an activity log, such as the audit log 161 and the sign-in log 162, may be represented in a graph data structure. FIG. 2 shows an example graph, which may represent information recorded in an audit log or a sign-in log. A graph contains a plurality of nodes (also referred to as "vertices") and edges that connect the nodes. In the example of FIG. 2, an edge 181 connects a node 12 to a node 11. Nodes may represent entities of the computer network. An edge has a direction, which is from the node 12 to the node 11 in the case of the edge 181. For the edge 181, node 12 is a source node and the node 11 is a destination node. An in-degree of a node is an edge that goes to the node and an out-degree of the node is an edge that originates from the node. In the example of FIG. 2, the node 11 has one in-degree (edge 181 that originates from the node 12) and two out-degrees (i.e., edge 182 that goes to the node 14 and an edge 183 that goes to the node 13. Each edge represents one or more attributes that link the two nodes connected by the edge.

Figure 3:
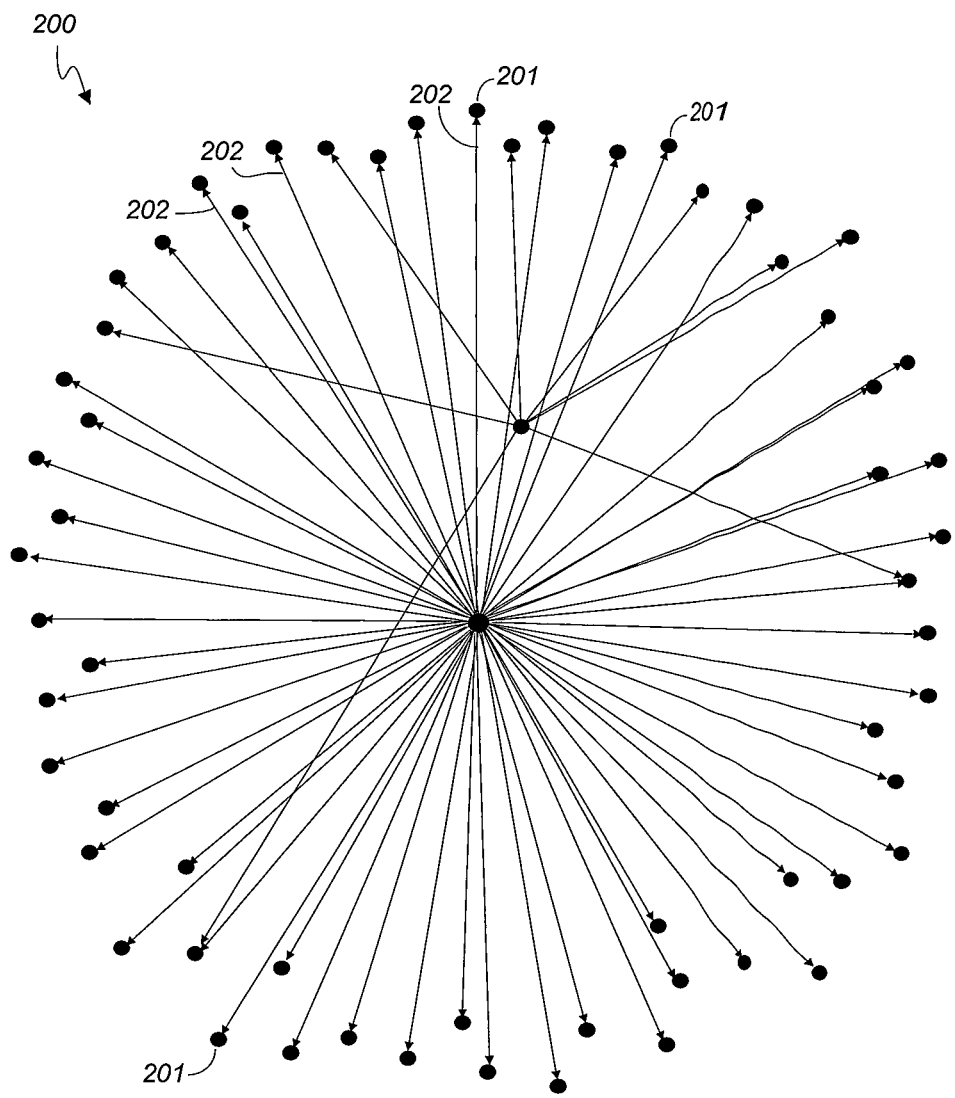
FIG. 3 shows an audit overview graph that is generated with audit activity information recorded in an audit log.

FIG. 3 shows an audit overview graph 200 that is generated with audit activity information recorded in an audit log (e.g., audit log 161). In the overview graph 200, the nodes are depicted as dots (e.g., see dots 201) that are connected by edges (e.g., see edges 202). In the overview graph 200, each node represents a user account and each edge represents an audit activity involving the user account. Because there are different types of audit activities involving many different user accounts, the overview graph 200 can be very complex.

Two findings may be observed from the overview graph 200. The first finding has to do with reasonable general distribution. More particularly, most nodes are distributed on the perimeter (outer portions) of the overview graph and have associated activities with central nodes; the nodes on the perimeter may be assumed as common, ordinary-privilege accounts. Also, a small number of nodes are concentrated in the center of the overview graph, which may indicate that these central nodes represent high-privilege user accounts (e.g., administration ("admin") accounts). The second finding has to do with possible individual user preference. That is, most nodes on the perimeter of the overview graph 200 have sparse connections with other nodes on the perimeter. Similar findings may be observed from an overview graph that is generated with sign-in activity information recorded in a sign-in log.

An overall directed graph may be generated with information recorded in a corresponding activity log (i.e., audit log or sign-in log). The nodes of the graph may be traversed to build separate subgraphs, with each subgraph having a central node that represents a target entity. A target entity may be a user account, an Internet Protocol (IP) address of a computer, or other entity that performs activities on the network. The entity is a "target" in that it is being evaluated for anomalous activities. That is, a subgraph allows for analysis of the target entity to detect whether or not the target entity has performed anomalous activities.

A subgraph comprises a central node that represents the target entity and neighbor nodes that are connected directly or indirectly to the central node. The distance of neighbor nodes to the central node depends on the cybersecurity implementation. In one embodiment, a neighbor node must be at most one node away from the central node, meaning there can only be one node between the central node and a neighbor node. As can be appreciated, the subgraph and other graphs disclosed herein may be displayed on a display screen or processed as a data structure. The subgraph may be displayed on a display screen with different edge colors, edge widths, edge labels, node colors, node sizes, etc. to depict different entity types, edge attributes, multiple attributes between a pair of nodes, etc.

Figure 4:
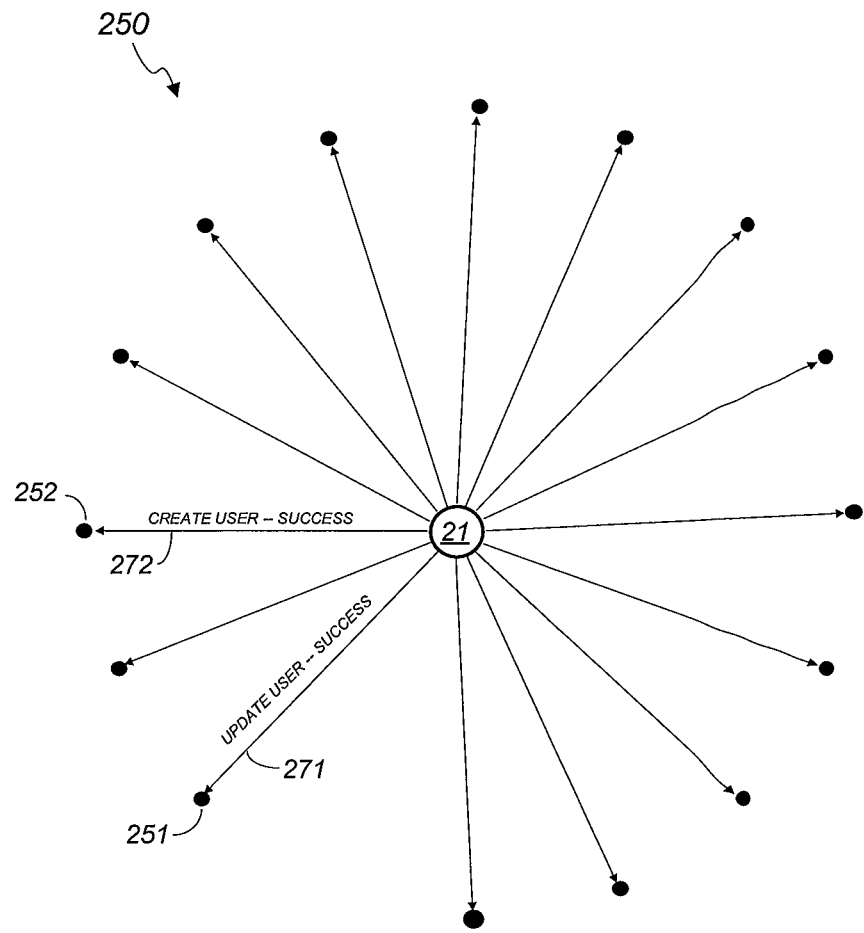
FIG. 4 shows an audit subgraph in accordance with an embodiment of the present invention.

FIG. 4 shows an audit subgraph 250 in accordance with an embodiment of the present invention. As its name indicates, the subgraph 250 comprises audit activity information. The subgraph 250 may be generated with information from an audit overall graph or directly with information from an audit log. The subgraph 250 has a centra node 21, which represents a target entity being evaluated for anomalous activities. In the example of FIG. 4, the central node 21 represent a user account. The subgraph 250 includes nodes connected to the central node 21 by edges that represent audit activities involving the central node 21 and the connected node. For example, the central node 21 is connected to a node 251 by an edge 271, which represents an "update user information" attribute, meaning the user account represented by the central node 21 successfully updated the user information of the user account represented by the node 251.

As another example, an edge 272 connecting the central node 21 to the node 252 represents a "create user" attribute, meaning the user account represented by the central node 21 successfully created a new user account represented by the node 252. As can be appreciated, any given graph may have a plurality of nodes, but only some are depicted in the figures for clarity of illustration.

Figure 5:
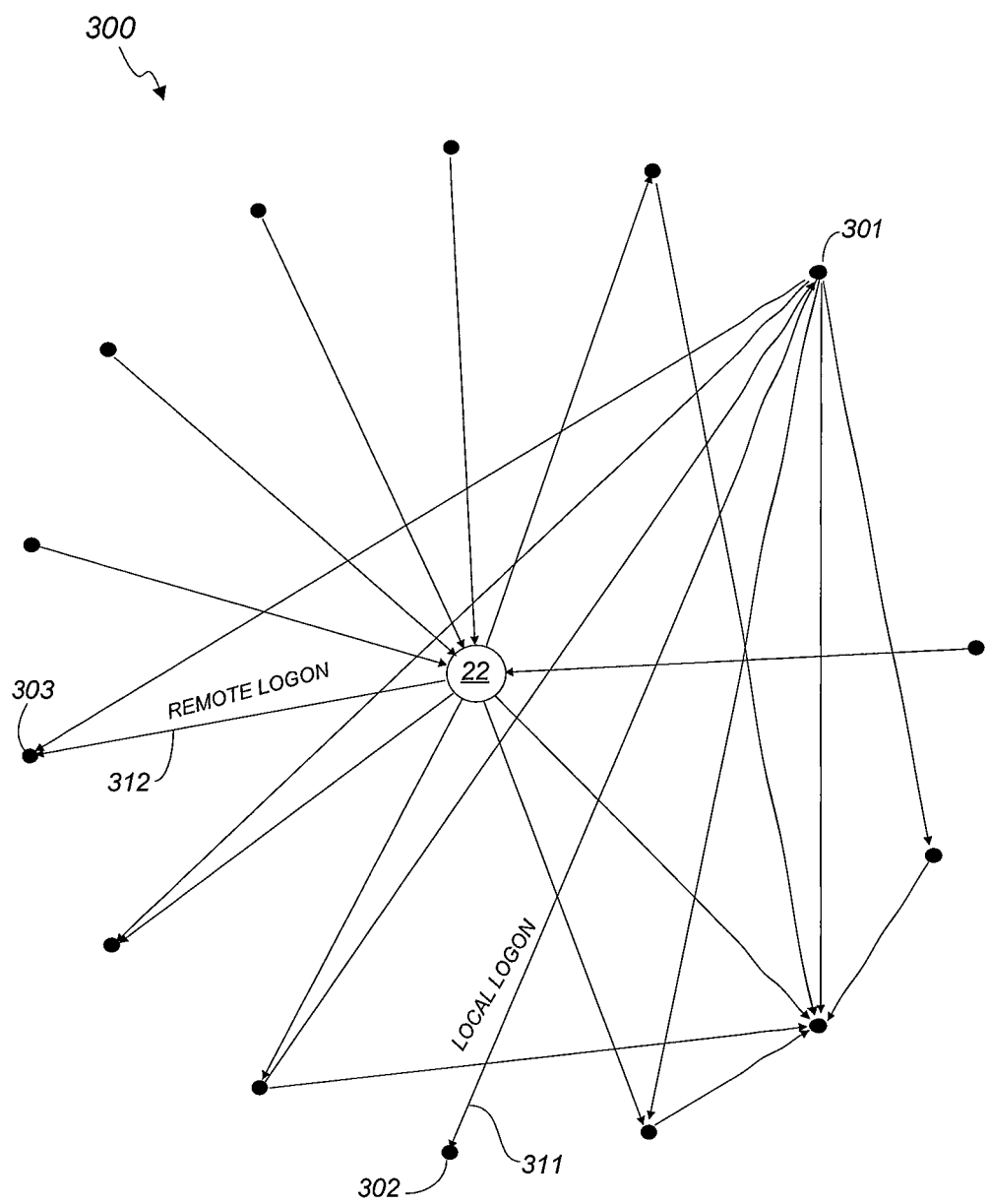
FIG. 5 shows a sign-in subgraph in accordance with an embodiment of the present invention.

FIG. 5 shows a sign-in subgraph 300 in accordance with an embodiment of the present invention. As its name indicates, the subgraph 300 comprises sign-in activity information. The subgraph 300 may be generated with information from a sign-in overall graph or directly with information from a sign-in log. The subgraph 300 has a centra node 22, which represents a target entity being evaluated for anomalous activities. In the example of FIG. 5, the central node 22 represents an IP address of a computer. The subgraph 300 includes nodes connected to the central node 22 with edges that represent sign-in activities involving the central node 22 and the connected node. For example, the central node 22 is connected to a node 303 by an edge 312 that represents a "remote logon" attribute, meaning a computer with the IP address represented by the central node 22 remotely logged on to a computer with an IP address represented by the node 303. As another example, an edge 311 connecting a node 301 to a node 302 represents a "local logon" attribute, meaning a computer with an IP address represented by a node 301 locally logged on a computer with an IP address represented by the node 302. The node 301 is included in the subgraph 300 because of its connection to the node 303, which in turn is connected to the central node 22.

A subgraph of a target entity reveals, in a clear manner, the historical behavior of a target entity, which can be evaluated to identify patterns of behavior of the target entity. For example, an audit subgraph of a target admin account may reveal that the admin account performs too many user or group management activities. As another example, a sign-in subgraph of the admin account may reveal that the admin account logons from multiple computers, whereas common accounts tend to logon from the same computer.

A baseline graph (e.g., baseline graph 163 of FIG. 1) is a subgraph of a target entity, with information on activities of a target entity during a first information collection period, which in one embodiment is 30 days. The information collection period for collecting activity information of the target entity for a baseline graph may be adjusted depending on the cybersecurity implementation but should be long enough to provide a baseline of historical behavior of the target entity.

A predict graph (e.g., predict graph 164 of FIG. 1) is a subgraph of a target entity, with information on activities of the target entity during a second information collection period, which in one embodiment is the last 24 hours, i.e., one-day's worth of activity information. The predict graph has an information collection period that follows and is shorter than that of the baseline graph. As a particular example, assuming the current date is Dec. 31, 2021, the predict graph may have activity information of the target entity for Dec. 31, 2021 and the baseline graph may have activity information of the target entity for Dec. 1, 2021 to Dec. 30, 2021.

A predict graph of a target entity may be compared to a corresponding baseline graph of the target entity to identify one or more activities in the predict graph that are new relative to the baseline graph. Such new activities may be anomalous because they are not consistent with the historical behavior of the target entity.

Figure 6:
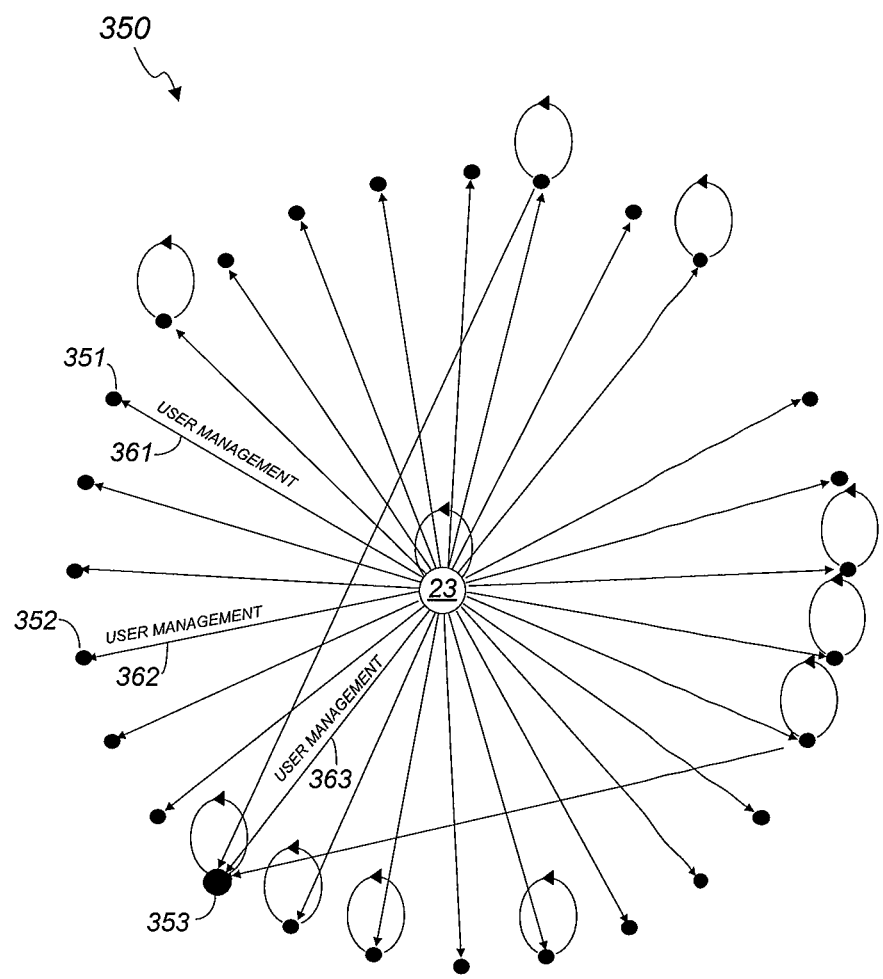
FIG. 6 shows an audit baseline graph in accordance with an embodiment of the present invention.

FIG. 6 shows an audit baseline graph 350 in accordance with an embodiment of the present invention. As its name indicates, the audit baseline graph 350 is a baseline graph comprising information on audit activities of a target entity during an information collection period, which in this example is 30 days. The target entity is represented by a central node 23, which in the example of FIG. 6 is a user account named "LIONEL-AYALA". The target entity represented by the central node 23 performed many user management activities involving many user accounts during the information collection period, e.g., as indicated by edges 361, 362, and 363 (each representing a user management attribute) that connect the central node 23 to neighbor nodes 351, 352, and 353 respectively. Each of the neighbor nodes 351-353 represents a user account.

Figure 7:
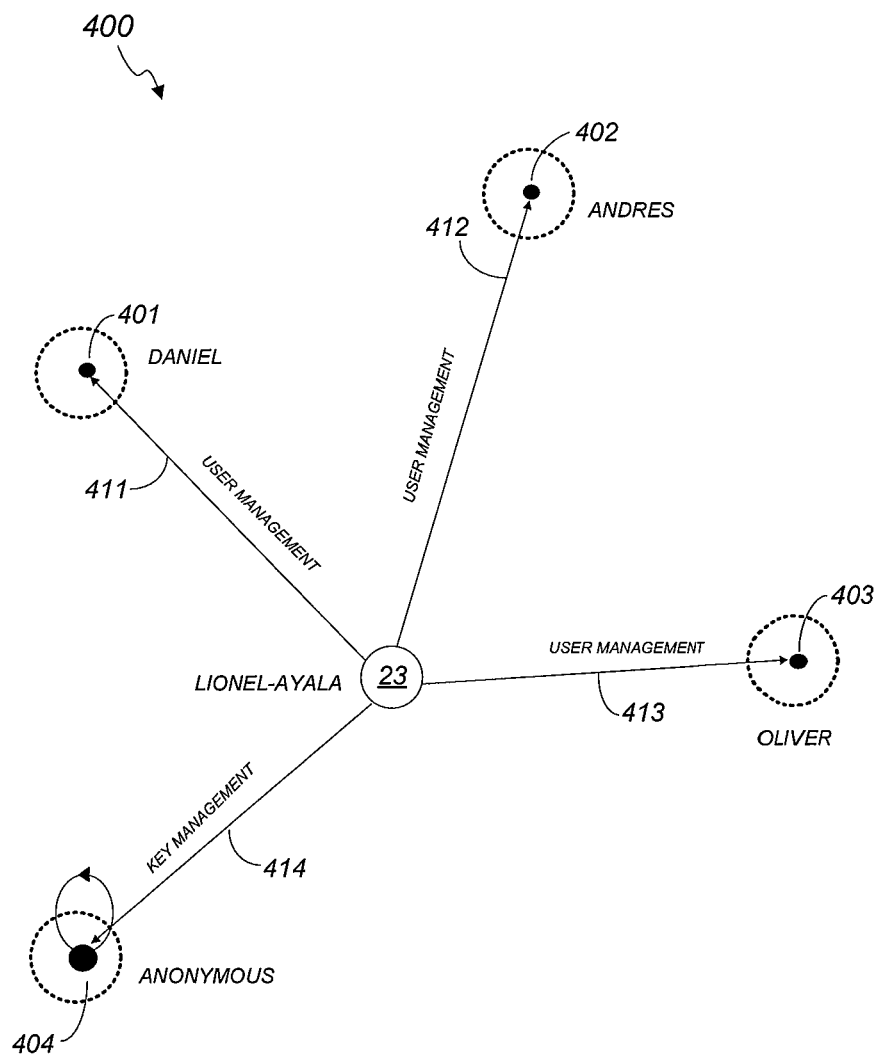
FIG. 7 shows an audit predict graph in accordance with an embodiment of the present invention.

FIG. 7 shows an audit predict graph 400 in accordance with an embodiment of the present invention. The audit predict graph 400 is the same as the audit baseline graph 350 except the audit predict graph 400 contains information on audit activities of the target entity during an information collection period (one day in this example) that is shorter than and follows that of the baseline graph 350 (30 days in this example). In the example of FIG. 7, the central node 23 represents the user account "LIONEL-AYALA", the node 401 represents a user account named "Daniel," the node 402 represents a user account named "Andres," and the node 403 represents a user account named "Oliver". The predict graph 400 shows that LIONEL-AYALA performed user management activities involving Daniel, Andres, and Oliver, as indicated by the edges 411-413, each of which has the "user management" attribute. Daniel, Andres, and Oliver are new user accounts, which are not in the baseline graph 350.

The predict graph 400 also shows that LIONEL-AYALA performed a key management activity (see attribute represented by edge 414) involving an anonymous (i.e., unknown) user account represented by a node 404. Also, the attribute of the edge 414 that connects the central node 23 to the node 404 is a new attribute that is not in the baseline graph 350. The nodes 401-404 are shown with dashed circles in FIG. 7 to indicate that they are new connections to the central node 23. The presence of new user accounts and new attributes involving LIONEL-AYALA makes LIONEL-AYALA highly suspicious. That is, the recent, one-day audit activities of LIONEL-AYALA are inconsistent with the behavior of LIONEL-AYALA in the audit baseline graph 350. This indicates that LIONEL-AYALA is likely performing unauthorized audit activities.

A residual graph may be constructed to facilitate visualization and identification of new nodes and edge attributes that are in the predict graph but not in the baseline graph. Such new nodes and edge attributes are highly suspicious as being inconsistent with the historical behavior of the target entity. A residual graph of a target entity may be constructed from corresponding baseline and predict graphs of the target entity using the following formula:

$$\text{Residual\_Graph} = \sum_{i}^{k} \text{new\_edge}_i, \text{ s.t. } i \text{ new attribute or } dest.$$

where k is the total number of newly appearing edges (attributes) or destination nodes. All new edges have a node set V and an edge set E. The node set V consists of a set of a source node and a destination node that are connected by the new edge. The edge set E consists of edges that connect the new nodes. Thus, an expression describing all new edges contributing to a residual graph may be:

$$\text{Residual\_Graph} = (V, E)$$

The following is an example algorithm for generating a residual graph.

```
adj = Predict._adj
for e in Baseline:
    u, v = e # src, dest node in edge e
    if u in adj and v in adj[u]:
        del adj[u][v]
        if u != v:
            del adj[v][u]
```

Figure 8:
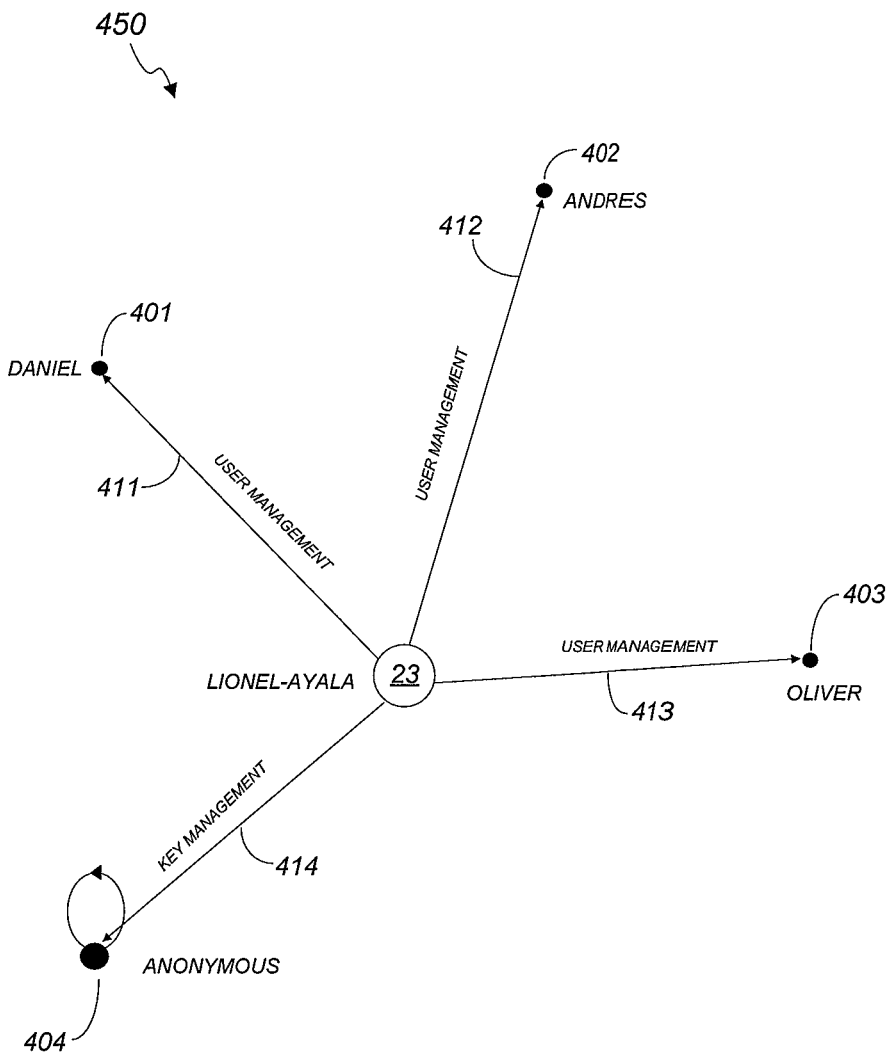
FIG. 8 shows an audit residual graph in accordance with an embodiment of the present invention.

FIG. 8 shows an audit residual graph 450 in accordance with an embodiment of the present invention. The residual graph 450 is generated from the baseline graph 350 and the predict graph 400 and shows new nodes and edge attributes that are in the predict graph 400 but not in the baseline graph 350. In this example, because the predict graph 400 only has new nodes and edge attributes, the predict graph 400 is identical to the residual graph 450. As can be appreciated, because baseline and predict graphs can have many nodes in practice, it is quite possible that a residual graph will not be identical to a corresponding predict graph.

Figure 9:
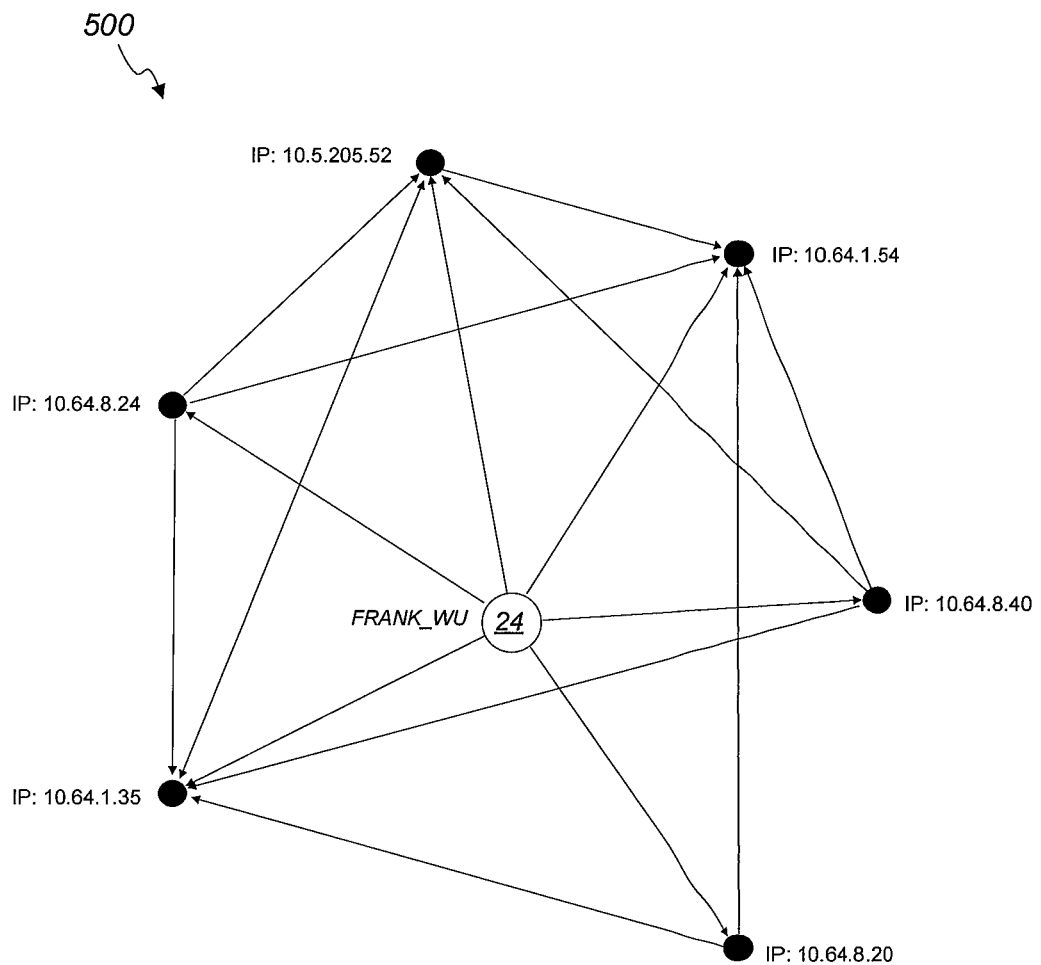
FIG. 9 shows a sign-in baseline graph in accordance with an embodiment of the present invention.

FIG. 9 shows a sign-in baseline graph 500 is accordance with an embodiment of the present invention. As its name indicates, the sign-in baseline graph 500 is a baseline graph comprising information on sign-in activities of a target entity during an information collection period, which in this example is 30 days. The target entity is represented by a central node 24, which in the example of FIG. 9 is a user account named "Frank_Wu". The target entity represented by the central node 24 performed many sign-in activities to many computers whose IP addresses are represented by dots in the baseline graph 500.

Figure 10:
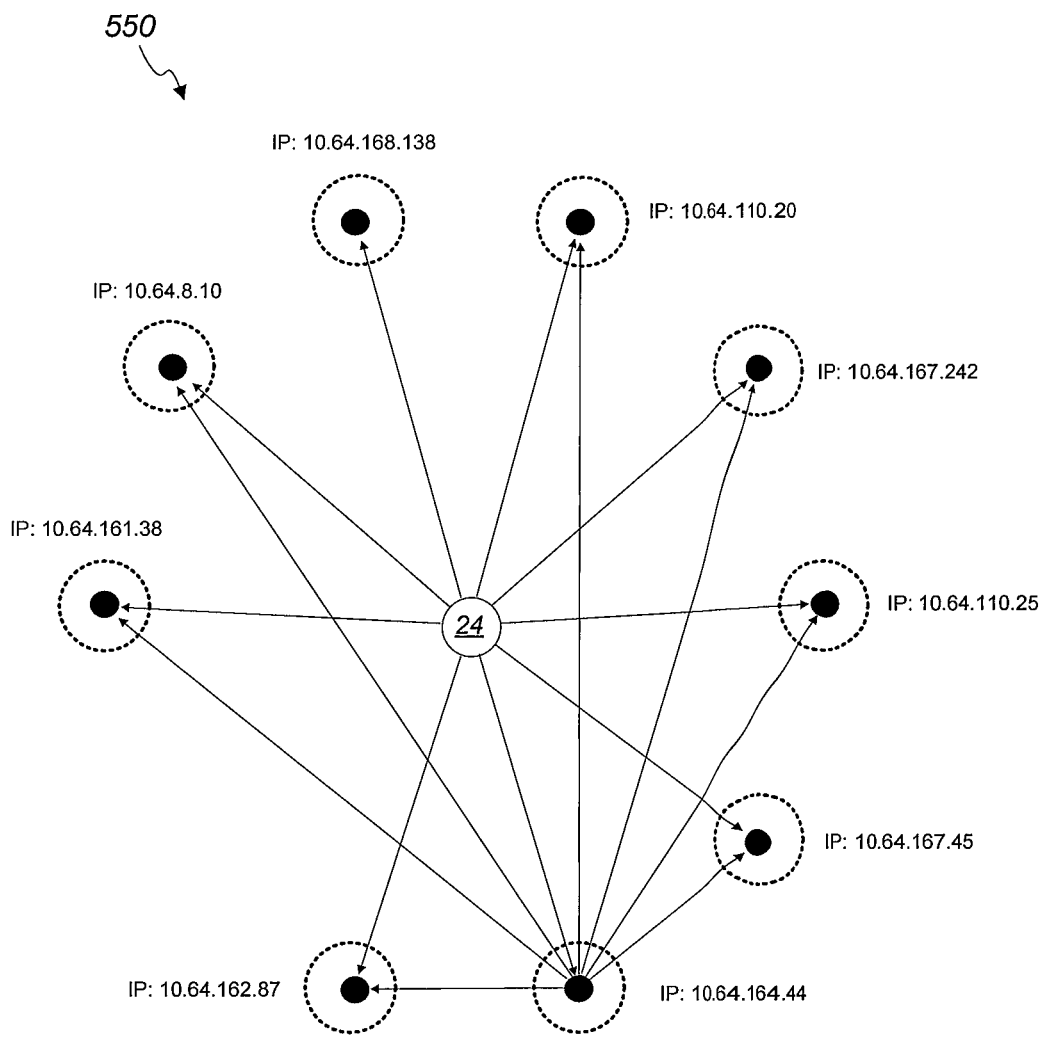
FIG. 10 shows a sign-in predict graph in accordance with an embodiment of the present invention.

FIG. 10 shows a sign-in predict graph 550 in accordance with an embodiment of the present invention. The sign-in predict graph 550 is the same as the sign-in baseline graph 500 except the sign-in predict graph 550 contains information on sign-in activities of the target entity during an information collection period (one day in this example) that is shorter than and follows that of the baseline graph 500 (30 days in this example). In the example of FIG. 10, the central node 24 represents the user account "Frank_Wu" and the neighboring nodes each represents an IP address of a computer on which Frank_Wu performed a sign-in activity. All of these nodes are shown with dashed circles in FIG. 10 to indicate that they are new nodes that are not in the baseline graph 500. The predict graph 550 indicates that Frank_Wu suddenly performed many sign-in activities to new computers, which is uncharacteristic of Frank_Wu per the baseline graph 500. This new behavior of Frank_Wu is highly anomalous and is indicative of a lateral movement attack.

Figure 11:
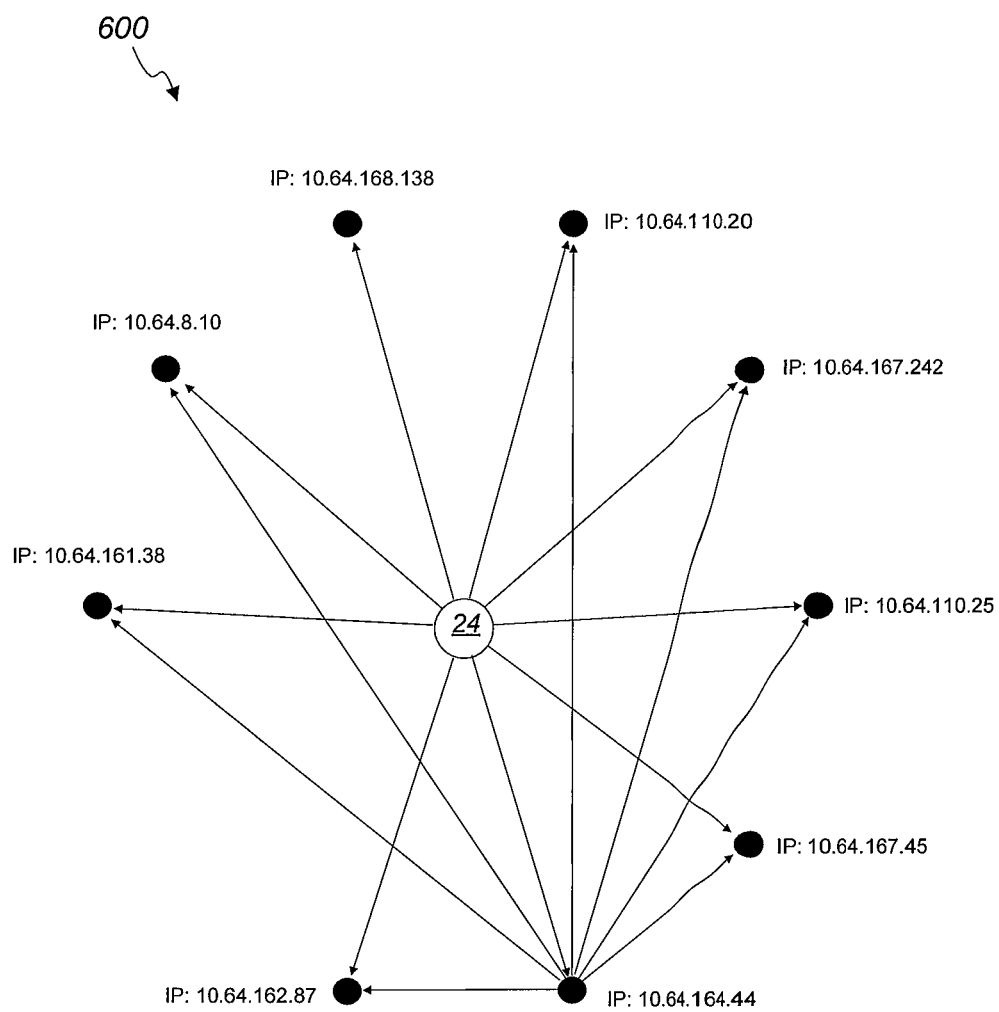
FIG. 11 shows a sign-in residual graph in accordance with an embodiment of the present invention.

FIG. 11 shows a sign-in residual graph 600 in accordance with an embodiment of the present invention. The residual graph 600 is generated from the baseline graph 500 and the predict graph 550 and shows the new nodes and edge attributes that are in the predict graph 550 but not in the baseline graph 500. In this example, because the predict graph 500 only has new nodes and edge attributes, the residual graph 600 is identical to the predict graph 550. As noted, this is not necessarily true in all cases because baseline and predict graphs can have many nodes in actual practice.

As can be appreciated, an audit or sign-in residual graph provides a clear picture of audit or sign-in activities of a target entity. The residual graph shows activities that are not in the baseline graph and are thus potentially anomalous. A residual graph may be scored to generate an anomaly ranking of the target entity of the residual graph. A formula for scoring a residual graph may be expressed as follows:

$$\text{Score}_{RS} = \sum_{i}^{k} w_j \frac{1}{N_i \text{out\_degree\_src} + N_i \text{in\_degree\_dest}},$$
$$\text{s.t. } i \in \text{new edge}$$

where k represents total number of new edges in the residual graph; wj is edge weight; j represents a specific attribute of edge i; $N_i$out_degree_src is the number of outgoing edges on the source node of the pair of nodes connected by the edge i; and $N_i$in_degree_dest is the number of incoming edges on the destination node of the pair of nodes connected by edge i. The edge weigh reflects the importance of the edge's attribute in the baseline activities, such as based on frequency for example.

In the above formula for scoring a residual graph, each new edge i has a pair of nodes, namely a source node (src) and a destination node (dest). The formula calculates the node degrees, calculates the sum of the node degrees, and takes a reciprocal of the sum, which looks like a derivative, where $$w_j = 1 - \frac{\text{count}(X_j)}{\text{count}(X)}$$

gives the weight of an edge with the attribute count(X)i j, which gives the importance of the edge; count(X) is the number of all edges in the matrix X (i.e., baseline graph), and count($X_j$) is the number of the edges with the attribute j in the matrix X. If the number of edges with the particular kind of attribute in the baseline graph is high, then the weight of the edge with the attribute should be set to a low value. Otherwise, if the number of edges with the particular kind of attribute in the baseline graph is low, then the weight of the edge with the attribute may be set to a high value.

Table 1 shows example residual graph scores of audit residual graphs of target entities.

TABLE 1

| Account | Audit Residual Graph Score |
| --- | --- |
| LIONEL-AYALA | 82 |
| Bhargavi | 75 |
| Ronnie | 71 |
| Stevanus | 47 |
| Chris | 26 |
| fim_password_service | 25 |
| Sync_LASAZAADC01P | 19 |

Similarly, Table 2 shows example residual graph scores of sign-in residual graphs of target entities.

TABLE 2

| Account | Sign-in Residual Graph Score |
| --- | --- |
| Frank_Wu | 98 |
| Will_Yang | 72 |
| YMTEST1 | 52 |
| CCG_ACCOUNT29 | 25 |
| Chris | 28 |
| Daniel | 22 |

A residual graph score may be compared to a threshold to determine if the target entity of the residual graph is performing anomalous activities. The threshold may be adjusted based on specific requirements, such as acceptable false positive or false negative rates. If the residual graph score is greater than the threshold, the target entity of the residual graph may be deemed to have performed one or more anomalous activities. Otherwise, if the residual graph score is equal to or less than the threshold, the target entity of the residual graph may be deemed to have performed normal activities. In the example of Table 1 above, assuming a threshold of 70, the accounts LIONEL-AYALA and Bhargavi have residual graph scores exceeding the threshold and thus may be deemed as having performed anomalous audit activities. Similarly, in the example of Table 2 above, assuming a threshold of 70, the accounts Frank_Wu and Will_Yang have residual graph scores exceeding the threshold and thus may be deemed as having performed anomalous sign-in activities.

Figure 12:
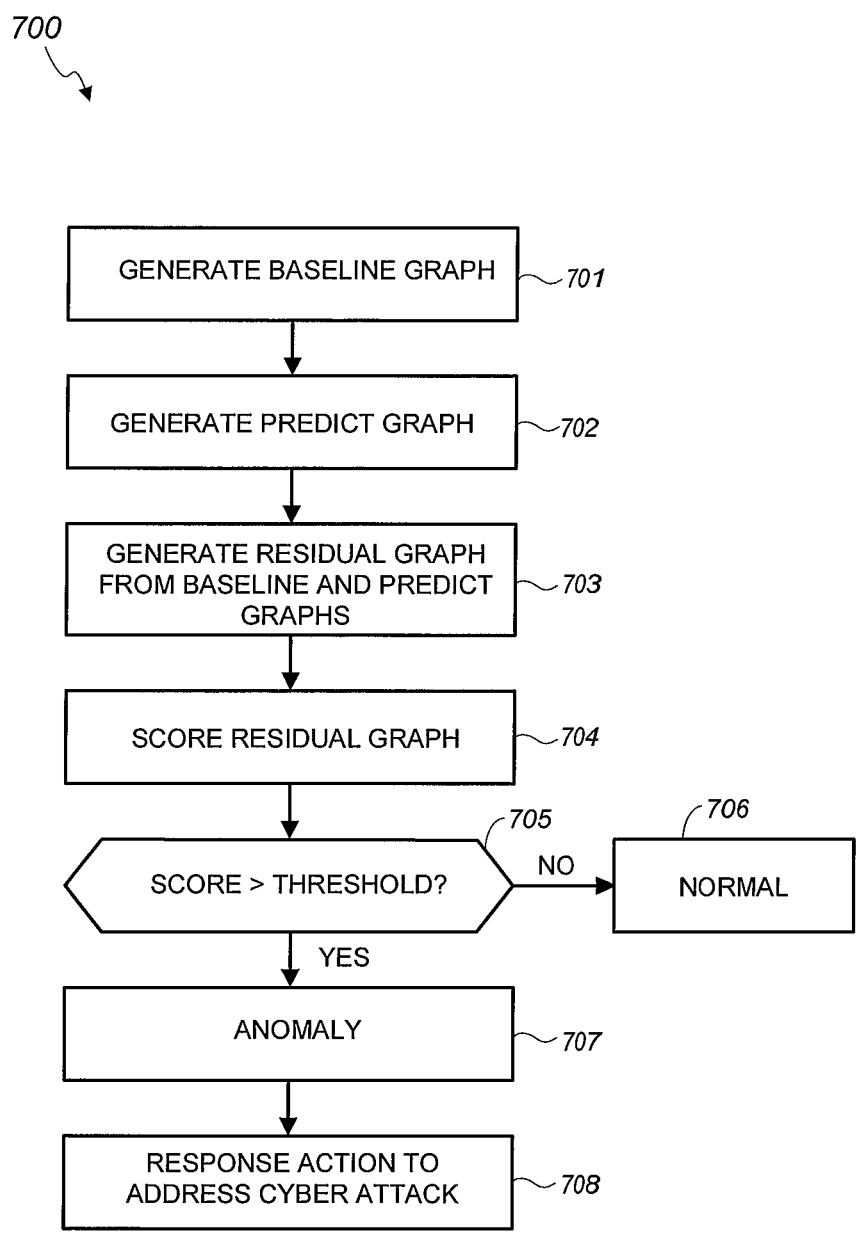
FIG. 12 shows a flow diagram of a method of detecting anomalous activities in a computer network in accordance with an embodiment of the present invention.

FIG. 12 shows a flow diagram of a method 700 of detecting anomalous activities in a computer network in accordance with an embodiment of the present invention. The method 700 may be performed by the anomaly detector 166 (shown in FIG. 1). As can be appreciated, other components may also be employed without detracting from the merits of the present invention.

In step 701, a baseline graph is generated with activity information of a target entity. An audit baseline graph of a target entity may be generated using audit activity information of the target entity recorded in an audit log. Similarly, a sign-in baseline graph of the target entity may be generated using sign-in activity information of the target entity recorded in a sign-in log. A baseline graph includes a central node representing the target entity and neighboring nodes that are directly or indirectly connected to the central node. The neighboring nodes and attributes of edges connecting the nodes depend on the type of the baseline graph (i.e., whether the graph is a sign-in graph or an audit graph). The baseline graph includes activity information of the target entity collected during an information collection period.

In step 702, a predict graph is generated with activity information of the target entity. An audit predict graph of the target entity may be generated using audit activity information of the target recorded in an audit log. A sign-in predict graph of the target entity may be generated using sign-in activity information of the target entity recorded in a sign-in log. A predict graph is the same as a baseline graph except that the predict graph has an information collection period that follows and is shorter than that of the baseline graph.

In step 703, a residual graph is generated from corresponding predict and baseline graphs. An audit residual graph is generated from corresponding audit predict and baseline graphs. Similarly, a sign-in residual graph is generated from corresponding sign-in predict and baseline graphs. A residual graph shows the differences between the predict graph and the baseline graph. More particularly, the residual graph shows nodes and/or edge attributes that are in the predict graph but not in the baseline graph.

In step 704, the residual graph is scored to generate a residual graph score that is indicative of whether or not the target entity of the residual graph has performed one or more anomalous activities. The residual graph may be scored based on weights of edges connecting the nodes of the residual graph, with an edge weight reflecting the importance of the attribute represented by the edge. In one embodiment, the edge weight is based on the number of times the edge with the attribute occurs in the baseline graph. Residual graph scores may be ranked to generate an anomaly ranking of entities as shown in Tables 1 and 2.

In step 705, the residual graph score is compared to a threshold. The activities of the target entity are considered to be normal when the residual graph score is equal to or less than the threshold as in step 705 to step 706. Otherwise, when the residual graph score is greater than the threshold as in step 705 to step 707, the activities of the target entity are considered to be anomalous.

In step 708, a response action may be performed in response to detection of an anomalous activity. For example, an alert may be raised in response to the anomalous activity. The alert may include displaying a message on a display screen, displaying the residual graph on a display screen with a warning message or color-coded message (e.g., displaying a node or edge representing the anomalous activity in a bright and/or flashing color), recording the detection of the anomalous activity in a log, alerting an administrator (e.g., by email, text message) etc. As can be appreciated, the alert attracts attention to the anomalous activity so that the anomalous activity and entity involved can be further investigated and addressed to protect the network from an actual or potential cyber attack.

Figure 13:
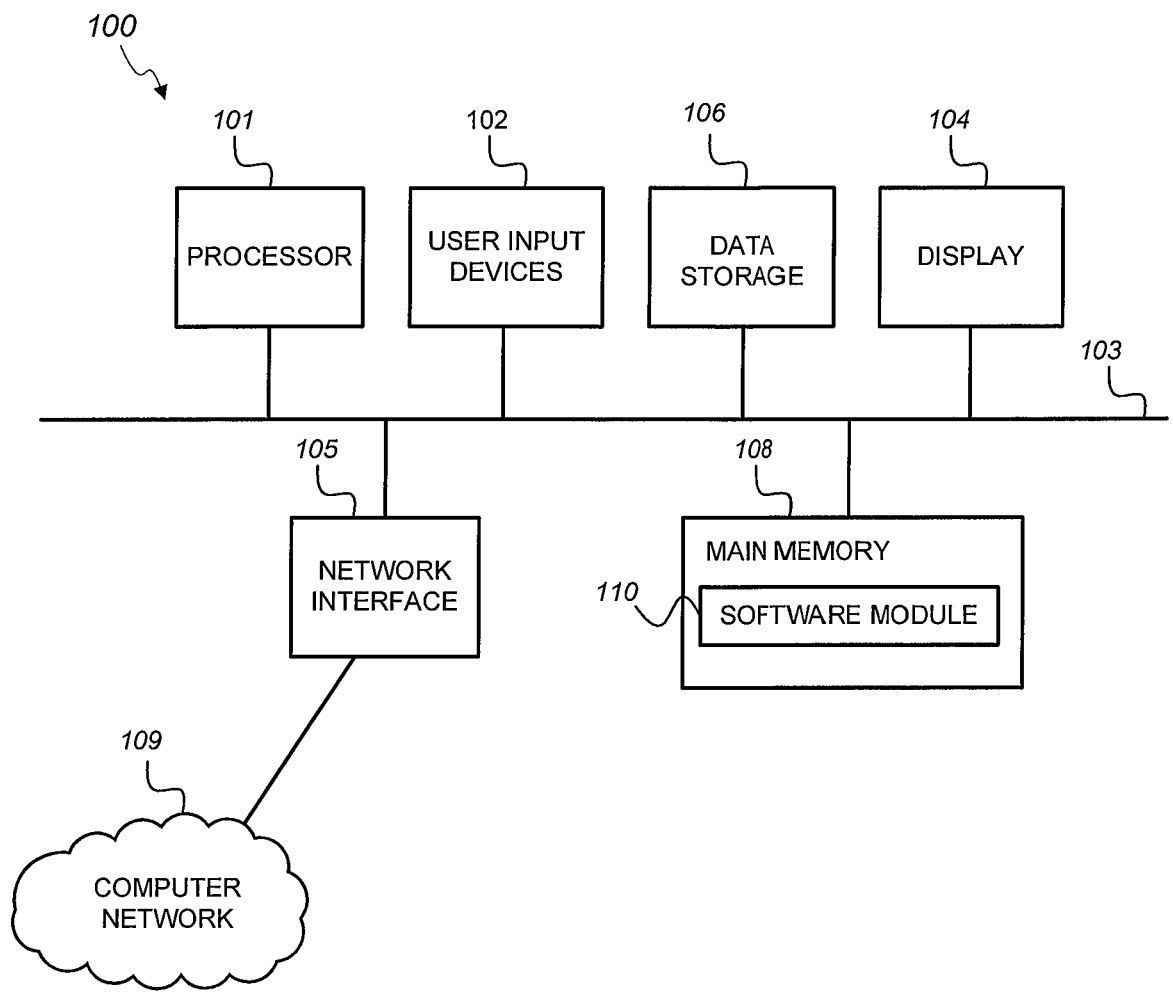
FIG. 13 shows a logical diagram of a computer system that may be employed with embodiments of the present invention.

Referring now to FIG. 13, there is shown a logical diagram of a computer system 100 that may be employed with embodiments of the present invention. The computer system 100 may have fewer or more components to meet the needs of a particular cybersecurity application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display screen 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules 110, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules 110. In one embodiment, the software modules 110 comprise instructions of an anomaly detector.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting an anomalous activity on a computer network, the method comprising:
generating a baseline graph of activities of a target entity, the baseline graph being generated with information on activities of the target entity during a first information collection period as recorded in an activity log of a cloud computing platform;
generating a predict graph of activities of the target entity, the predict graph being generated with information on activities of the target entity during a second information collection period as recorded in the activity log of the cloud computing platform, wherein the second information collection period follows and is shorter than the first information collection period;

generating a residual graph that indicates nodes or edges that are in the predict graph but not in the baseline graph, wherein the baseline graph, the predict graph, and the residual graph each comprises a central node and neighbor nodes that are connected to the central node by corresponding edges, the central node represents the target entity, and each edge represents an attribute of an activity performed by the target entity on another entity represented by a neighbor node that is connected to the central node by the edge;

generating a score of the residual graph based at least on weights assigned to edges that are connected to the central node in the residual graph; and deeming the target entity as having performed one or more anomalous activities in response to the score of the residual graph being greater than a threshold.

2. The method of claim 1, wherein the target entity is a user account on the computer network.

3. The method of claim 2, wherein the other entity is another user account.

4. The method of claim 2, wherein the other entity is an Internet Protocol (IP) address.

5. The method of claim 2, wherein the log of the cloud computing platform is an audit log and the information on activities of the target entity during the first information collection period and the information on activities of the target entity during the second information collection period comprise audit activities.

6. The method of claim 5, wherein the audit activities include user management activities.

7. The method of claim 6, wherein the user management activities include creation of other user accounts.

8. The method of claim 2, wherein the log of the cloud computing platform is a sign-in log and the information on activities of the target entity during the first information collection period and the information on activities of the target entity during the second information collection period comprise sign-in activities.

9. The method of claim 1, further comprising raising an alert in response to the target entity being deemed as having performed one or more anomalous activities.

10. A computer system comprising at least one processor and a memory, the memory storing instructions that when executed by the at least one processor cause the computer system to:

generate a baseline graph of activities of a target entity, the baseline graph being generated with information on activities of the target entity during a first information collection period as recorded in an activity log of a cloud computing platform;

generate a predict graph of activities of the target entity, the predict graph being generated with information on activities of the target entity during a second information collection period as recorded in the activity log of the cloud computing platform, wherein the second information collection period follows and is shorter than the first information collection period;

generate a residual graph that indicates nodes or edges that are in the predict graph but not in the baseline graph, wherein the baseline graph, the predict graph, and the residual graph each comprises a central node and neighbor nodes that are connected to the central node by corresponding edges, the central node represents the target entity, and each edge represents an attribute of an activity performed by the target entity on another entity represented by a neighbor node that is connected to the central node by the edge;

generate a score of the residual graph based at least on weights assigned to edges that are connected to the central node; and consider the target entity as having performed one or more anomalous activities in response to the score of the residual graph being greater than a threshold.

11. The computer system of claim 10, wherein the target entity is a user account on the computer network.

12. The computer system of claim 10, wherein the other entity is another user account.

13. The computer system of claim 10, wherein the other entity is an Internet Protocol (IP) address.

14. The computer system of claim 10, wherein the log of the cloud computing platform is an audit log and the information on activities of the target entity during the first information collection period and the information on activities of the target entity during the second information collection period comprise audit activities.

15. The computer system of claim 10, wherein the log of the cloud computing platform is a sign-in log and the information on activities of the target entity during the first information collection period and the information on activities of the target entity during the second information collection period comprise sign-in activities.

16. A method of detecting an anomalous activity on a computer network, the method comprising:

generating a baseline graph of activities of a target entity, the baseline graph being generated with information on activities of the target entity during a first information collection period;

generating a predict graph of activities of the target entity, the predict graph being generated with information on activities of the target entity during a second information collection period, wherein the second information collection period follows and is shorter than the first information collection period;

generating a residual graph that indicates nodes or edges that are in the predict graph but not in the baseline graph, wherein the baseline graph, the predict graph, and the residual graph each comprises a central node and neighbor nodes that are connected to the central node by corresponding edges, the central node represents the target entity, and each edge represents an attribute of an activity performed by the target entity on another entity represented by a neighbor node that is connected to the central node by the edge; and detecting that the target entity has performed one or more anomalous activities based at least on information in the residual graph.

17. The method of claim 16, wherein detecting that the target entity has performed one or more anomalous activities based at least on information in the residual graph comprises:

generating a score of the residual graph based at least on weights assigned to edges that are connected to the central node in the residual graph; and detecting that the target entity has performed one or more anomalous activities in response to the score of the residual graph being greater than a threshold.

18. The method of claim 17, wherein the weights are based on a number of occurrences of the edges in the baseline graph.

19. The method of claim 16, wherein the target entity is a user account.

20. The method of claim 16, wherein the target entity is an Internet Protocol (IP) address.

* * * * *